March 15, 1966   R. G. KNUDSEN ETAL   3,241,055
DISTRIBUTOR TESTING INSTRUMENT
Filed Dec. 3, 1959   7 Sheets-Sheet 1

INVENTORS
Raymond G. Knudsen
BY Robert E. Badger
Zabel, Baker, York
Jones & Dithmar
Attorneys

INVENTORS
Raymond G. Knudsen
Robert E. Badger
BY Zabel, Baker, York,
Jones & Dithmar
Attorneys United States Patent Office 3,241,055
Patented Mar. 15, 1966

3,241,055
DISTRIBUTOR TESTING INSTRUMENT
Raymond G. Knudsen, Kenosha, and Robert E. Badger, Twin Lakes, Wis. (both of 8028 28th Ave., Kenosha, Wis.)
Filed Dec. 3, 1959, Ser. No. 857,148
8 Claims. (Cl. 324—17)

This invention relates to a testing instrument, and in the embodiment described herein relates more particularly to an instrument for testing and adjusting distributors for internal combustion engines. In addition, this invention provides means for testing and analyzing devices using high frequency electrical contacts.

Distributor testing instruments, such as those described in U.S. patents to Haskins Nos. 1,996,066 and 2,050,530, have been widely used in industry. These instruments employ at least one and often two glow tubes, usually neon lamps, which are connected to the distributor being tested in such a way that whenever the points or contacts on the distributor close, the neon lamps go on, and when the points open, the neon lamps turn off.

In such instruments, both the shaft of the distributor being tested and the neon lamps are mounted so they rotate either at the same speed, or so the neon lamps rotate at a multiple of the speed of the distributor shaft, which is usually kept in the speed range it normally encounters on an engine. Since the cam of the distributor causes the distributor points to close and open a fixed number of times for each revolution of the distributor shaft, the neon lamps will likewise turn on and off the same number of times each time they make a revolution.

When the distributor points close, the rotating neon lamps light up, and since the lamps are rotating around an axis, they appear as a continuous band of light until the points are opened by a lobe on the distributor cam.

The number of continuous bands of light formed for each revolution of the neon lamps equals the number of times the points of the distributor close for each revolution of the distributor shaft. The arc length of this continuous band of light is a measure of the period of time the points are closed and is known as the cam angle or dwell.

At high rotational velocities, such as are encountered during use on internal combustion engines, the effect of persistence of vision in the human eye causes the bands of light from the neon lamps to form apparently stationary illuminated arcuate bands which are uniformly spaced around the axis of rotation of the neon lamps.

A study of these light patterns, and in particular the variations in the lengths of these arcuate bands and the appearance of gaps or separations in their continuity indicates the presence of defects in the distributor, caused for example, by a bent distributor shaft, defective shaft bearings, loose breaker plates, and bouncing contacts due to incorrect spring tension. Experience with these testing instruments enables a user to tell by observation of the light patterns the precise nature of the defects in the distributor.

In testing instruments of this kind, exact synchronization between the opening and closing of the points on the distributor with the flashing on and turning off of the neon lamps is essential. It is apparent that any delay or time lag in the response of the neon lamp in either flashing on when the points close, or turning off when the points open, will create a light pattern where the length of the arcuate bands is not a true reflection of the period of time when the points are closed, and this would cause errors in the interpretation of the instrument.

Heretofore, as taught by Haskins Patent No. 1,966,066, for example, a sufficiently high D.C. voltage source was directly connected to the neon lamps through the distributor points to provide the voltage necessary to operate these lamps. This method was objectionable for several reasons. First the high D.C. voltage across the points of the distributor was injurious to these points and is a great hazard to the person using this equipment. In addition there was an objectionable time lag between the opening and closing of the points and the response of the lamp. Furthermore the distributor condenser had to be disconnected from the distributor during the test, otherwise the neon lamps would continue to glow for at least a period of time after the points opened due to voltage surges into and out of the condenser. This would cause the light pattern to give a false indication of the operation of the distributor.

Removal of the distributor condenser and its subsequent reconnection was objectionable because it required extra time and labor. In addition there was a possibility that the condenser would not be reconnected or would be reconnected improperly after the test was completed.

To reduce the time lag inherent in the above described method of operating the neon lamps, some distributor testing instruments have been provided with a radio frequency power supply to provide the voltage necessary to operate the neon lamps, but this procedure has several objectionable features. First of all, such power supplies are rather expensive. In addition, because of the high frequencies involved, when more than one power supply was used, the power supply for one neon lamp could affect the operation of the other lamp. Besides, the high frequencies employed by these power supplies interfered with local radio reception. Also, the condenser of the distributor still had to be removed because at the high frequencies involved the condenser acted like a short circuit around the distributor points.

It is apparent that a distributor testing instrument which operates in such a way that a distributor can be tested without removing the distributor condenser, which does not introduce any appreciable time lag between the closing and opening of the distributor points and the turning on and off of the neon lamps in the speed ranges involved, which does not interfere with radio reception or with other power supplies in the instrument, and which is comparatively inexpensive to manufacture would be a useful improvement over the prior distributor testing instruments.

Distributor testing instruments of this kind use a tachometer to correlate and study the behavior of the distributor throughout specific rotational velocities in the range of speeds the distributor encounters during actual use. Since the speed range is rather large, either the indicia on the tachometer must be closely spaced which makes the tachometer hard to read and introduces errors in the adjustment of the rotational speed of the distributor shaft, or else a more expensive, larger tachometer is necessary. In prior testing instruments, economy of manufacture required the use of the smaller tachometer at the expense of convenience and accuracy.

It is evident that it would be desirable to economically modify the tachometer meter used in the prior testing instruments in such a way that it can be easily and accurately read regardless of the speed range of the shaft of the distributor under test.

In testing instruments of this kind, it is important that the speed of the motor used to drive the distributor shaft remains constant for each speed setting. But in prior testing machines these motors were controlled by a rheostat which was sensitive to temperature. Consequently changes in temperature due to continued operation of the motor caused the speed of the motor to vary. A mechanical drive, using for example a variable sheave or other kind of mechanical transmission, could eliminate the speed variation resulting from changes in temperature, but would be too expensive. In view of these considerations, it is apparent that it would be best to control the speed of the motor by some inexpensive electronic device which is insensitive to temperature.

As stated above, the distributor testing instrument is provided with a motor for driving the distributor shaft. This requires that the instrument be provided with a distributor mounting structure with vise jaws for holding the distributor in a fixed position where it can be connected to the driving clutch or gear in the test instrument. Furthermore, the distributor mounting structure must be adjustable to permit distributors of widely varying sizes to be tested. In addition, the distributor mounting structure must be easy to operate because of the importance of the time element and the high cost of labor.

In the past, distributor mountings which best satisfied these requirements were rather expensive because of the large numbers of parts involved in their construction and because of the time and difficulty involved in mounting and aligning these parts on the testing instrument. It is evident, therefore that an inexpensive, adjustable, easy to operate mounting strucure for holding a distributor securely on the testing instrument in operative relationship with the drive motor while the distributor shaft is being rotated would be a useful improvement.

In distributor testing instruments of the kind described, the neon lamps rotate above or below the surface of an angularly calibrated disk so that the magnitude of the arc of the light band can be read on the disk. In prior testing instruments it was difficult to read the arc length of this lighted band accurately because the neon lamps rotated around the same axis as the distributor shaft, so that the calibrated disk was concentric with both the distributor shaft and the axis of rotation of the neon lamps. Since in prior testing instruments the distributor projected perpendicularly out from the surface of the calibrated disk the scales on the disk had to be observed at an angle from the vertical. This introduced errors in reading the length of the illuminated arc on the scale due to parallax. It is clear that a distributor testing instrument where the calibrated disk can be observed from a perpendicular angle instead of at an angle with respect to the perpendicular could be read more accurately and easily.

Among other things, therefore, important objects of this invention are to provide a distributor testing instrument which includes all the above described advantageous features.

These and other objects of this invention will become more apparent when read in the light of the accompanying drawings and specification wherein.

Figure 1:
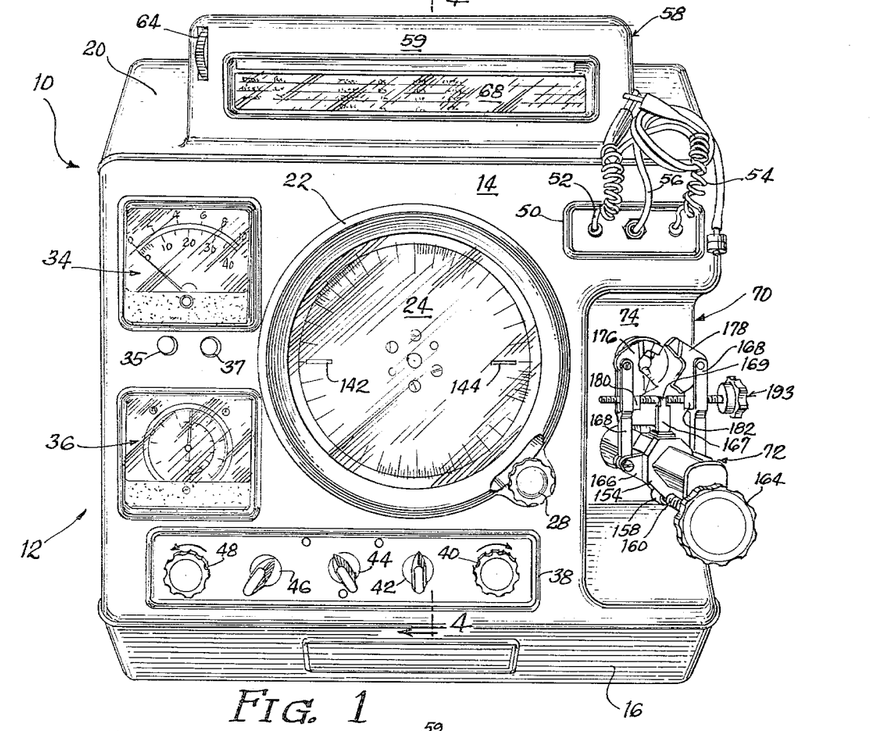
FIG. 1 is a front perspective view of the distributor testing instrument embodying the features of this invention.
Figure 2:
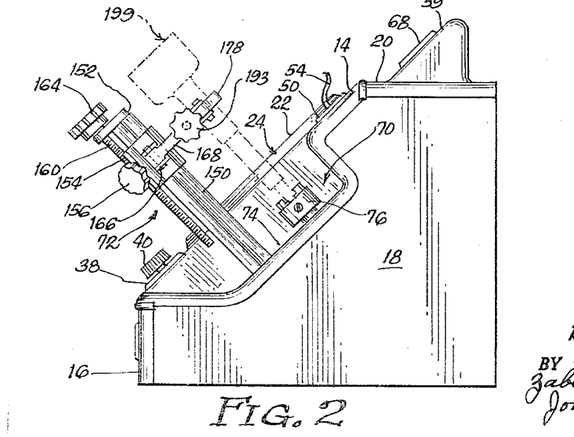
FIG. 2 is a side elevational view of the distributor testing instrument shown in FIG. 1.

Referring now to FIG. 1 of the drawing, a distributor testing instrument indicated generally by the reference numeral 10 has a housing indicated generally by 12. The housing 12 includes a front rearwardly and upwardly inclined panel 14, a vertical front wall 16, end walls 18, and a top horizontal wall 20, see FIG. 2.

An opening defined by a surrounding circular outwardly extending flange 22 is centrally positioned on front panel 14. A transparent disk 24, calibrated on its periphery throughout 360° to form a circular scale, is mounted in this opening by means of a plurality of sheaves 26, see FIG. 3. These sheaves are rotatably mounted on shafts 27 which are secured to a spring member 27A. Spring member 27A is secured to panel 14 at point 27B by any conventional means, see FIG. 4. The peripheral edge of disk 24 rides in the grooves of the sheaves, and this arrangement rotatably holds the disk closely adjacent the base of flange 22, see FIG. 4.

To precisely rotate disk 24 on panel 14 for adjustment purposes, a control mechanism is provided. This control mechanism includes an adjusting knob 28 mounted on one end of a shaft 30, see FIGS. 1 and 3. The shaft 30 extends through panel 14 and its inner end is rigidly secured to a roller or sheave 32. This sheave is in frictional engagement with the edge of the disk. With this arrangement disk 24 may be rotated easily and accurately by manually rotating the knob 28.

Front panel 14 is further provided with openings in which a tachometer meter 34 and a vacuum gauge 36 are mounted for reasons to be described below. In addition, a panel 38 is formed on the lower portion of panel 14 in which control elements 40, 42, 44, 46 and 48 are mounted, see FIG. 1. An additional panel 50 is formed on the upper portion of panel 14 through which leads 52 and 54 along with vacuum hose 56 extend, for reasons to become apparent below.

A smaller housing 58, generally triangular in cross section and including an inclined front wall 59, extends upwardly from top wall 20. A pair of horizontally disposed, spaced parallel rollers 60 and 62 are mounted inside this housing by any conventional means, see FIG. 4. A finger operated wheel 64 concentric with and rigidly secured to roller 62 extends through an opening in front wall 59 so that rotation of wheel 64 causes roller 62 to rotate. A roll chart 66 is mounted on rollers 60 and 62 in such a way that rotation of the finger operated wheel 64 causes the roll chart to move in an orbit around the rollers. A window 68 is formed in the front wall 59 of housing 58 to permit inspection of the roll chart 66. This roll chart 66, illuminated by a lamp 67, contains data about each of the distributors in commercial use so that the operator of the distributor testing instrument can by inspection of the chart compare the actual performance of the distributor being tested with the performance it should have according to the data on the chart.

As further seen in FIG. 1, a deep recess or well indicated generally by the reference numeral 70 is formed in the panel 14. A distributor support or holder indicated generally by the reference numeral 72 and a drive clutch or chuck indicated by the reference numeral 76 for rotating the shaft of the distributor being tested extend upwardly from the base 74 of well 70, see FIG. 9.

Figure 3:
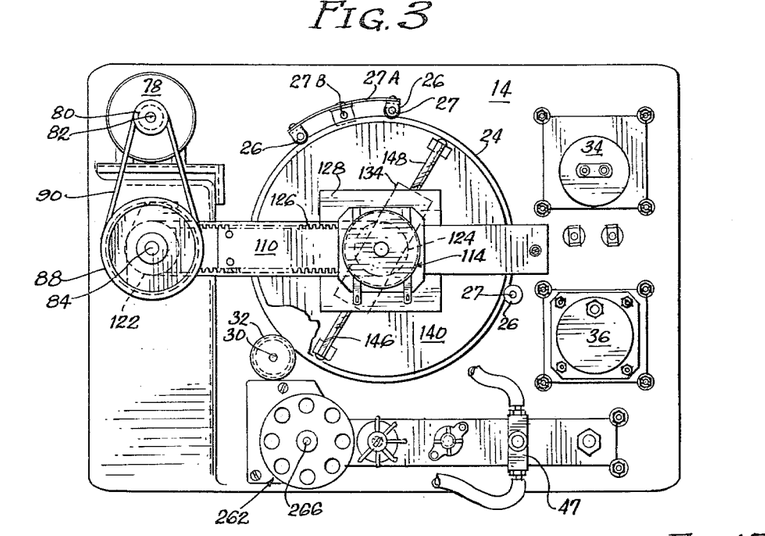
FIG. 3 is a rear view of the sloping front panel of the distributor testing instrument.
Figure 9:
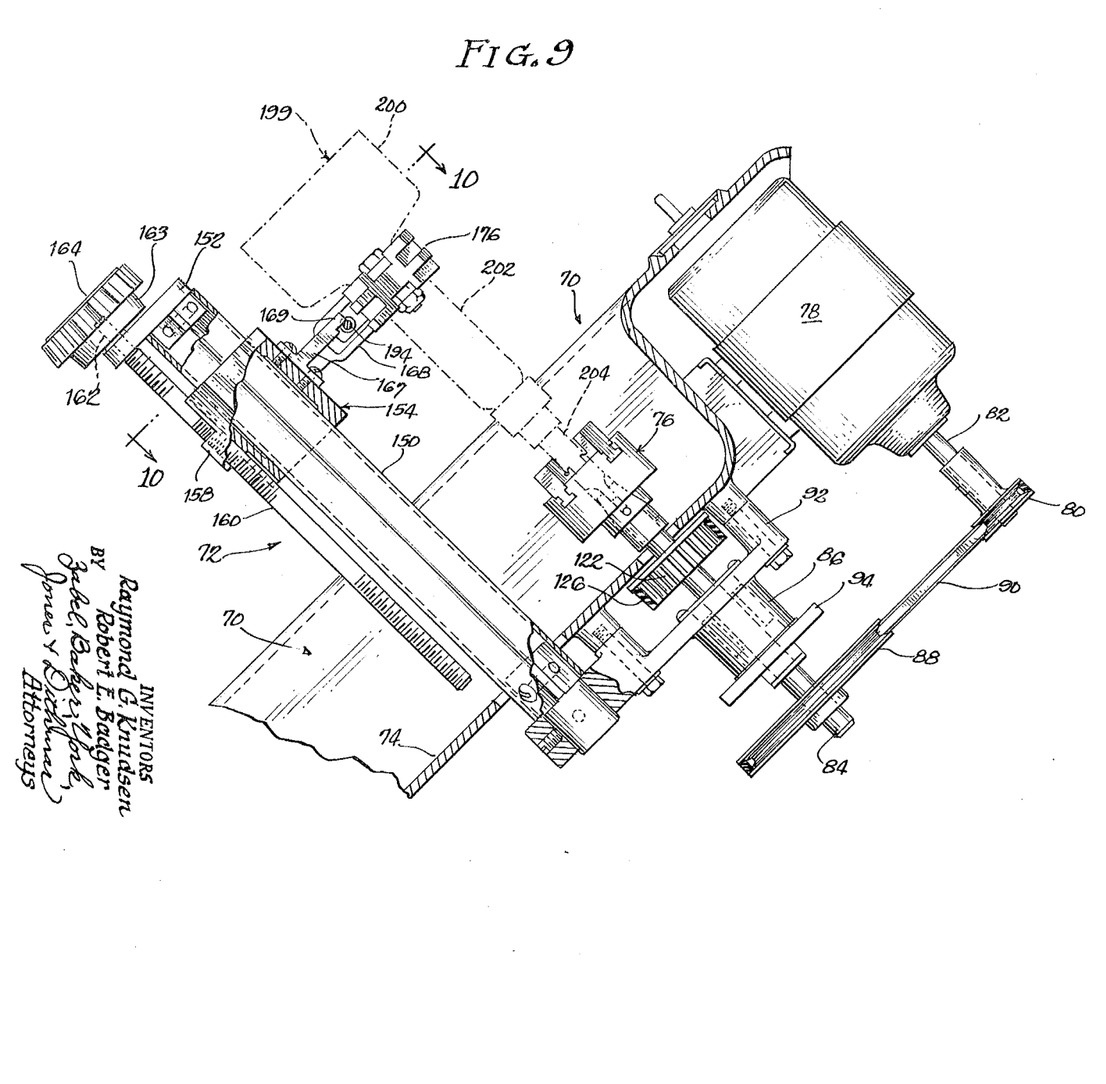
FIG. 9 is an enlarged sectional view of the front panel showing details of the way the mounting structure for the distributor, and motor for driving the distributor are mounted thereon.

An electric motor 78 is mounted on the inner surface of panel 14 by any conventional means, see FIGS. 3 and 9. A pulley wheel 80 is rigidly mounted on shaft 82 of this motor. A second or drive shaft 84 rotatably journalled in bearings 86 is mounted in spaced parallel relationship below motor shaft 82. A second and larger pulley wheel 88 is rigidly mounted on the lower end of drive shaft 84, and clutch or chuck 76 is mounted on its upper end. Pulley wheel 88 is connected to pulley wheel 80 by means such as belt 90. With this arrangement, operation of motor 78 causes shaft 84 to rotate and this in turn drives the chuck or clutch 76.

Figures 7, 8:
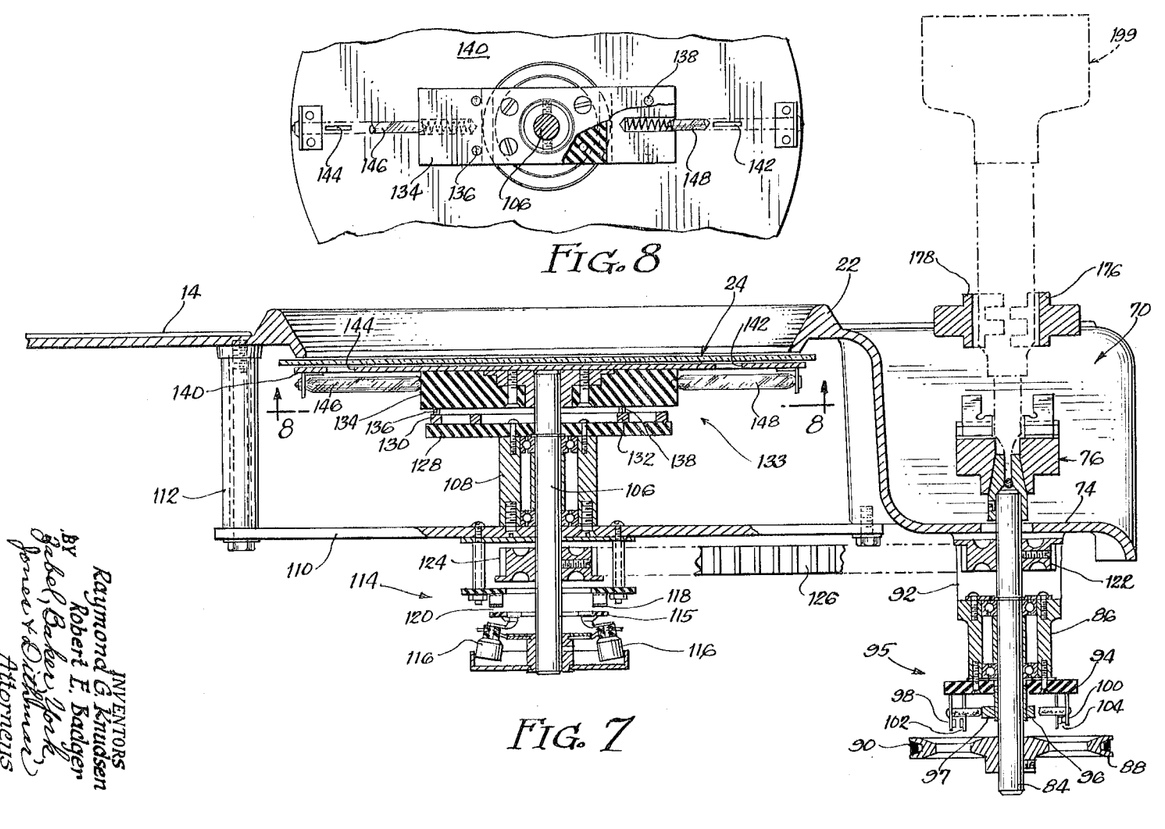
FIG. 7 is a side sectional view of a portion of the sloping front panel and elements attached thereto.
FIG. 8 is a sectional view taken on the line 8—8 of FIG. 7.

The bearings 86 for shaft 84 are mounted on a support 92, see FIG. 9. The support 92 in turn is secured by any conventional means to the inner surface of the base 74 of the well 70. As best seen in FIGS. 7 and 9, a first insulated support plate 94 is rigidly secured to the lower end of bearings 86.

A dual breaker point structure indicated generally by the reference numeral 95 (FIG. 7) includes a balanced cam disk 96 which is rigidly secured to shaft 84 just below the insulated support plate 94. It is understood, however, that the location of the cam disk is not critical and it could just as well be mounted on other rotatable shafts in the testing instrument. In addition, a pair of spring mounted electrical contacts 98 and 100 depending from support plate 94 are mounted on opposite sides of the shaft 84, see FIGS. 7 and 13. Fixed contacts 102 and 104, also depending from support plate 94, are mounted in closely spaced operative relationship with contacts 98 and 100 respectively.

The cam disk 96, in this particular embodiment, has a radially enlarged peripheral cam surface 97 extending 180° around its periphery, and the positions of the contacts are such that when the feeler of contact 98 engages the cam surface 97 of the disk, it separates contacts 102 and 98. At the same time since the feeler of contact 100 on the opposite side of the shaft is not contacting the cam surface 97 of the disk, it is not deflected and remains in engagement with contact 104. In a like manner, when shaft 84 makes a half of revolution, contacts 98 and 102 close while contacts 100 and 104 separate. Consequently for each revolution of shaft 84, contacts 98 and 102 are closed for half of the revolution, while contacts 100 and 104 are closed for the other half.

A third or driven shaft 106 is rotatably mounted in bearings 108, see FIG. 7. These bearings are secured to a support bar 110 by any conventional means. This support bar, as here shown, is secured at one end to the base 74 of well 70 and at the other end to a spacer 112 which is large enough so that the support bar 110 is held parallel to panel 14.

A conventional centrifugal double pole double throw switch 114 is mounted on a shaft by any conventional means. This switch includes a number of weights 116 mounted on a ring 115 (FIGS. 6 and 7) and the usual contacts including movable contact 117 associated with fixed contacts 118 and 119 (FIG. 4), and duplicate movable contact 120 (FIG. 13) associated with contacts 121 and 123. In operation, when shaft 106 is rotated beyond a predetermined speed, the centrifugal force exerted on weights 116 causes the weights and the ring they are mounted on to move in such a way that movable contact 117 leaves contact 118 and moves to contact 119 while movable contact 120 leaves contact 121 and moves to engage contact 123. Similarly, when the rotational speed of shaft 106 drops below this predetermined value, then all contacts automatically return to their initial position in a manner well known in the art.

Cog wheels 122 and 124 are rigidly secured to drive shaft 84 and driven shaft 106 respectively, see FIG. 7. These cog wheels in this particular embodiment are the same size and are connected together by means of a flexible cog belt 126 formed from rubber or like material. With this arrangement, rotation of shaft 84, which causes cog wheel 122 to rotate, will drive shaft 106 through cog belt 126 and cog wheel 124. Furthermore, shafts 84 and 106 will rotate at exactly the same speed because the cog wheel and cog belt structure permits no slippage in the speed range normally encountered. This arrangement is important because as will be described below the neon lamps are mounted for rotation about a different axis than the rotational axis of the distributor shaft. Consequently the calibrated disk or scale 24 can be viewed from a perpendicular angle without interference. This eliminates errors in measuring the length of the illuminated bands due to parallax.

Figures 4, 5, 6:
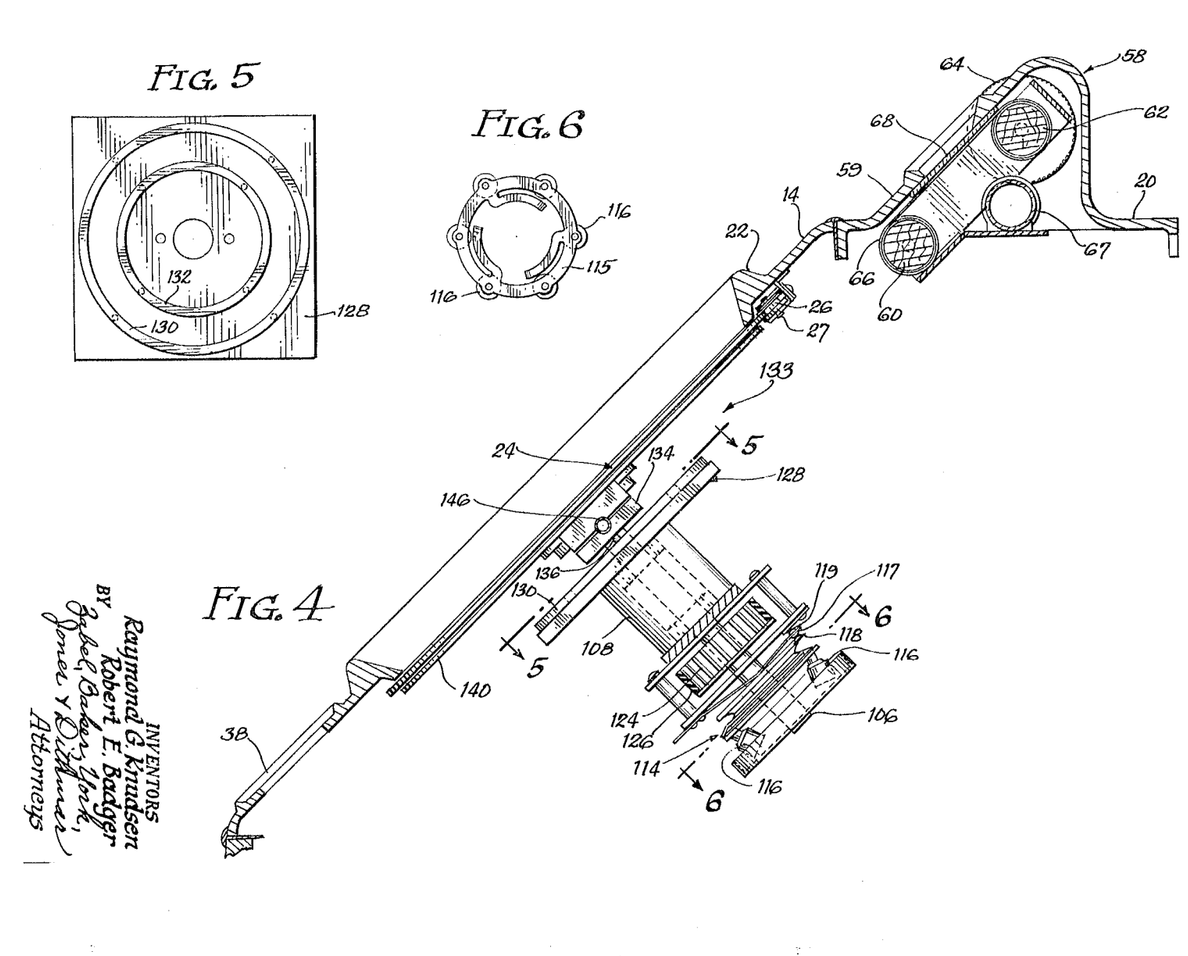
FIG. 4 is a sectional view of the sloping front panel of the distributor testing instrument taken on line 4—4 of FIG. 1.
FIG. 5 is a sectional view taken on the line 5—5 of FIG. 4.
FIG. 6 is a sectional view taken on the line 6—6 of FIG. 4.

A second insulated support plate 128 (FIGS. 4 and 7) is rigidly secured to the upper end of the fixed bearings 108. As best seen in FIG. 5, two concentric electrically conductive rings 130 and 132 are mounted on its upper surface.

An indicator designated generally by the reference numeral 133 and associated with the disk or scale 24 comprises a support bar 134 rigidly secured to the upper end of shaft 106, and rotatable therewith, see FIGS. 4 and 7. A pair of electrically conductive carbon type brushes 136 and 138 are secured to the lower surface of the support bar 134 by any conventional means. Support bar 134 is mounted just far enough above support plate 128 so that brushes 136 and 138 are in continuous sliding contact with the conductive rings 130 and 132.

A combined masking and support disk 140 is rigidly secured to the upper surface of the support bar 134 just below scale 24. This support disk is provided with linear radially spaced slots 142 and 144 which are positioned 180° apart around the axis of shaft 106 for reasons to become apparent below, see FIGS. 1, 7 and 8.

A pair of neon lamps 146 and 148 each are secured at one end to support bar 134 and at the other end to support disk 140 by any conventional means. These lamps are positioned directly below slots 144 and 142, see FIG. 8. With this arrangement, the indicator 133 comprising the support bar 134, the support disk 140, and the neon lamps 146 and 148 all rotate with shaft 106. In addition when the neon lamps are energized their light will be visible through slots 142 and 144 and will form a light pattern on the transparent disk or scale 24. This light pattern is somewhat dependent on the rotational speed of the distributor shaft and the condition of the various elements of the distributor. These neon lamps are arranged to give different colored light. In this case lamp 146 is red and lamp 148 is blue for reasons to become apparent below.

Figure 10:
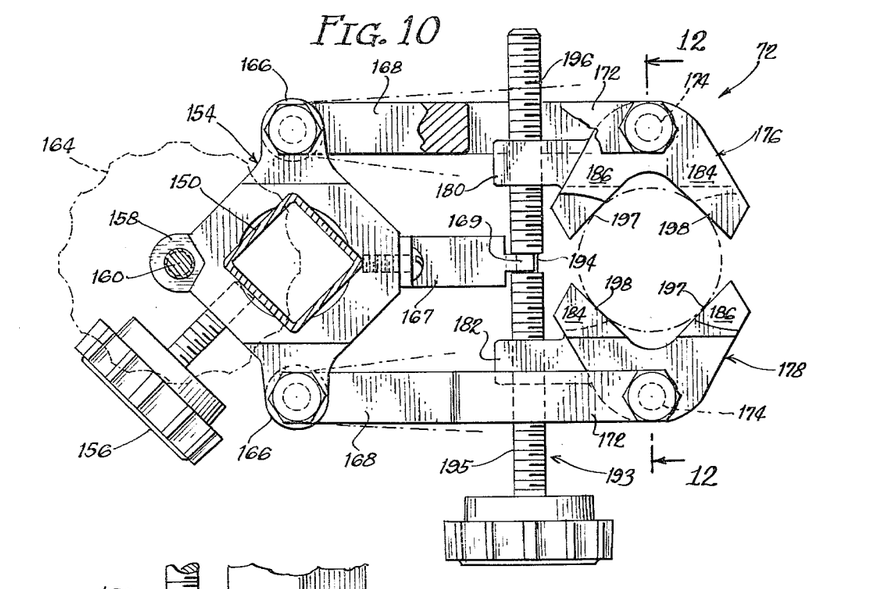
FIG. 10 is a sectional view taken on the line 10—10 of FIG. 9.

The distributor support or holder 72 comprises an upstanding support bar 150, rectangular in cross section, see FIGS. 9 and 10. The lower end of this support bar extends through an opening in the base 74 of the well 70 in panel 14, and is rigidly secured to support 92 by any conventional means. This gives support 92 the dual function of supporting both shaft 84 and support bar 150.

A support plate 152 is rigidly mounted on the upper end of support bar 150. A sleeve 154 having an opening to conform to the cross sectional shape of the support bar 150 is slidably mounted on the support bar. A lock bolt 156 (FIGS. 2 and 10) having an enlarged turning knob extends through a threaded opening in sleeve 154, and its inner end is adapted to engage the support bar 150. By rotating the head of the lock bolt 156 in the proper direction, the inner end of this bolt moves into locking engagement with bar 150 so that sleeve 154 can be rigidly held at any point along support bar 150. This is important because distributors vary substantially in size and the distributor holder 72 must be adjustable so it can hold them all.

Figure 11:
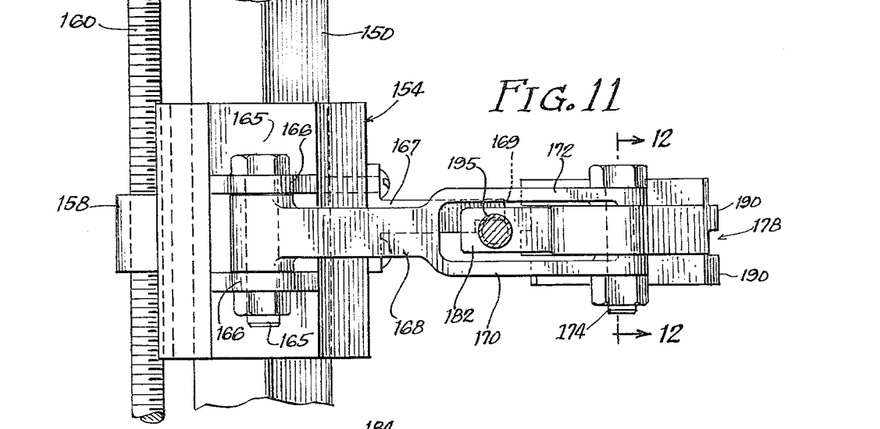
FIG. 11 is an enlarged portion of the mounting structure for the distributor showing details of the vise jaws.

Sleeve 154 further includes a cylindrical threaded nut 158 extending parallel to the longitudinal axis of support bar 150, see FIG. 11. An elongated adjusting bolt 160 is in threaded engagement with nut 158. As seen in FIG. 9, adjusting bolt 160 is provided with a reduced upper end 162 which extends through an opening in the support plate 152 and washer spacer 163. The extreme end of the reduced end 162 is rigidly secured to an adjusting knob 164 whereby rotation of the adjusting knob 164 moves the sleeve 154 up and down the length of the support bar 150 for purposes of adjustment.

The sleeve 154 is further provided with spaced parallel integrally attached ears 166 and with an outwardly extending support member 167 which terminates in a guide finger 169, see FIGS. 1, 10 and 11. Arms 168 are pivotally attached to these ears by pivot pins 165 which extend through openings in one end of these arms and which are received in aligned openings in the ears 166. The opposite end portions of arms 168 are bifurcated defining spaced parallel furcations or tines 170 and 172, see FIG. 11.

Vise jaws 176 and 178 are provided. These vise jaws include integrally attached lever guide portions 180 and 182, and diverging jaw portions 184 and 186 on each vise jaw. Jaw portion 184 is provided with spaced parallel teeth 188, and jaw portion 186 is provided with spaced parallel teeth 190, see FIG. 12. The teeth on the opposed jaw portions are offset from each other, and the spacing between the parallel teeth on each vise jaw is sufficient to permit penetration by teeth on the opposed vise jaw. With this arrangement the vise jaws can move closer together and can securely grip distributors with small diameter bearing sleeves.

Figure 12:
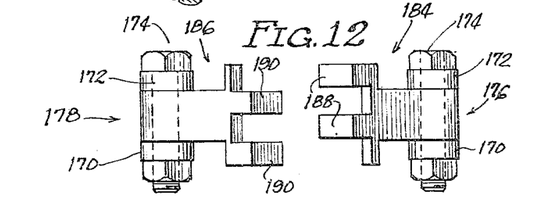
FIG. 12 is a sectional view taken on the line 12—12 of FIG. 11.

The vise jaws 176 and 178 are provided with openings through which pivot pins 174 extend, see FIG. 12. These pivot pins are journalled in openings at the extreme ends of the tines 170 and 172 whereby the vise jaws are pivotally mounted on arms 168 between the tines of furcations 170 and 172, see FIGS. 11 and 12.

An adjusting screw 193 has a reduced central portion 194 and oppositely threaded end portions 195 and 196. These end portions are in threaded engagement with threaded openings in the end of the lever guide portions 180 and 182, see FIG. 10.

The arms 168, vise jaws 176 and 178, and the adjusting screw 193 are positioned so that guide finger 169 engages the reduced central portion 194 of the adjusting screw 193 to maintain the arms 168, the vise jaws 176 and 178, and the adjusting screw 193 properly centered with respect to the clutch or chuck 76.

The angular relation between the lever guide portions 180 and 182 and the diverging jaw portions, and the engagement between the adjusting screw 193 and the lever guide portions 180 and 182, is such that when the vise jaws are mounted on the arms 168, the work contacting surfaces 197 and 198 on jaw portions 186 and 184 of the opposed vise jaws 176 and 178 are parallel to each other.

With this arrangement, rotation of adjusting screw 193 pivots the arms 168 so the vise jaws move toward or away from each other depending on the direction of rotation of screw 193, and at the same time this rotation of screw 193 pivots each vise jaw in a direction opposite to the direction its arm is being pivoted so that the parallel relationship between the work contacting surfaces 197 and 198 is maintained regardless of the angular position of the arms 168.

This constant parallel relationship between the respective work contacting surfaces 197 and 198 permits them to have a planar shape and the vise jaws will still grip the bearing sleeve of the distributor shaft securely. If this parallel relationship were not maintained at all positions of the arms 168, the work contacting surfaces 197 and 198 would require a more complex shape with the result that the vise jaws would be more costly to manufacture.

It is also noted that jaw portions 184 and 186 are substantially perpendicular to each other, but this is not critical and other angular relationships are possible and are contemplated. Additionally, the arms 168 are mounted so they diverge slightly at the maximum separation of the vise jaws and converge slightly at minimum separation so that the total movement of the vise jaws toward sleeve 154 is minimized as the vise jaws are moved together. This is important because it permits the distributor mounting structure to hold distributor shafts in substantial alignment with the driving chuck 76 regardless of their diameter.

It is apparent that the parts of the distributor support described above are easy and inexpensive to make. In addition the particular structure of the support bar, the sleeve, the arms, and the vice jaws facilitates their assembly on the instrument because the previously troublesome problems of alignment have been substantially eliminated.

Figure 13:
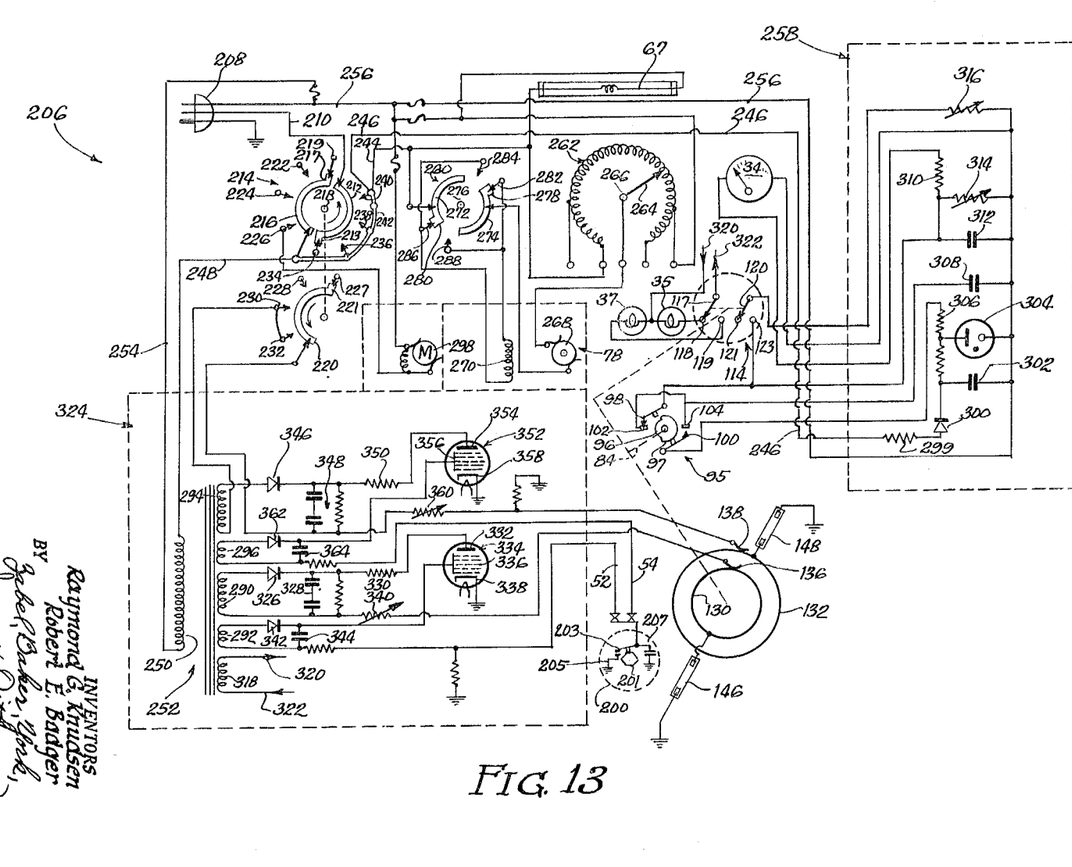
FIG. 13 is a circuit diagram of the distributor testing machine.

A conventional distributor indicated generally by the reference numeral 199, shown in dotted lines in the drawing, has an external form best shown in FIG. 9. As shown in FIG. 13, a distributor consists of a housing 200 containing a cam 201, points 203 and 205, and a condenser 207. A shaft bearing sleeve 202 (FIG. 9) depends from the base of the housing 200 and the distributor shaft 204 which is rigidly connected to the cam 201 is rotatably mounted in the sleeve 202.

A portion of the distributor shaft 204 extends out from sleeve 202, and the end of this shaft is adapted to be in operative engagement with the clutch 76 in a manner well known in the art.

After sleeve 154 is properly positioned on the support bar 150 and the end of the distributor shaft 204 is operatively connected to the clutch of chuck 76, screw 193 is rotated to move the vise jaws 176 and 178 into gripping engagement with the bearing sleeve 202 to hold the distributor on the testing machine.

With this arrangement, operation of the motor 78 causes the distributor shaft 204 and its cam (not shown) to rotate just as though the distributor were mounted on an engine.

An understanding of the operation of the testing instrument can best be gained by reference to the circuit diagram indicated generally by the reference numeral 206, see FIG. 13.

Power is supplied to the circuit of the testing instrument through the power input plug 208. One line 210 is connected to a semi-circular contact 212 which is a part of a multiple control switch 214. This contact includes a radially extending tab 213. The switch 214 also includes a second semi-circular contact 216 with its radially extending tab 217. Both contacts 212 and 216 are positioned so they are concentric with and mechanically connected to the axis of switch shaft 218. This shaft is rigidly connected at one end to the control element 42 so that rotation of shaft 218 by means of control element 42 causes contacts 212 and 216 to rotate along with shaft 218.

In addition, the control switch 214 includes a third semi-circular contact 220 with a radially extending tab 221. This contact is also mechanically connected to and concentric with shaft 218 so that it too rotates with the shaft.

A first group of separate contacts 219, 222, 224 and 226 are disposed around the axis of shaft 218 in radially spaced relation to the semi-circular contact 216 and in the path of tab 217. A second group of contacts 227, 228, 230 and 232 are in radially spaced relation to the semi-circular contact 220. In addition a series of contacts 234, 236, 238 and 240 are radially spaced from contact 212 and in the path of tab 213. Of these, contacts 236, 238 and 240 are all connected to common contact 242 while contact 234 is always open.

When the control element 42 is rotated to the first position causing shaft 218 to rotate in a counterclockwise direction, tab 217 moving with contact 216 leaves the off position open contact 219 and first moves into engagement with open contact 222. At the same time tab 213 moving with contact 212 leaves open contact 234 and moves into engagement with contact 236. Simultaneously tab 221 moving with contact 220 leaves open contact 227 and moves into engagement with open contact 228.

This movement of switch 214 permits current to flow from wire 210 through contact 212 to the common contact 242. From common contact 242 the current flows to wires 244, 246 and 248.

Wire 248 leads to the primary 250 of the power transformer 252 and returns via wire 254 to a fuse and then to the return wire 256. This energizes the transformer. At the same time, power from line 246 flows to a portion 258 of the tachometer circuit, which in the circuit diagram is shown as enclosed in a dotted rectangle. The current returns via a fuse to wire 256. This energizes the tachometer so it indicates on meter 34 (FIG. 1) the rotational speed of the distributor shaft as described below.

In addition, as seen by the inspection of the circuit diagram, power from line 244 will enter the reversing switch, indicated generally by the reference numeral 260, the lamp 67 for the roll chart 66, and the variable transformer 262 and return to 256 via a fuse. This as described below starts motor 78 operating and turns on lamp 67 for the roll chart 66.

The variable transformer 262 includes a movable tap 264 which is rigidly secured to a shaft 266, as shown. A portion of this shaft extends through panel 14 and is secured to the adjusting or control element 40 so that rotation of the control element moves the tap 264 along the coil of the transformer. This causes the voltage supply to the motor 78 to vary and consequently controls its speed. It is important to note that the operation of this variable transformer is not affected by changes in temperature normally encountered so that it is particularly well suited as an economical speed adjusting device for motors used in distributor testing instruments.

As seen, the variable tap 264 of transformer 262 is connected to the rotor 268 of the motor 78. The field coils 270 of this motor are connected to the reversing switch 260 so that the direction of rotation of the motor shaft can be changed.

The reversing switch 260 consists of two semi-circular contacts 272 and 274 which are concentric with and mechanically connected to a shaft 276 so that the semi-circular contacts and the shaft all rotate together.

The semi-circular contacts include radially extending tabs 278 and 280. Tab 278 is movable with contact 274 only between contacts 282 and 284 while tab 280 is movable with contact 272 only between contacts 286 and 288. A study of the reversing switch 260 and the field coils 270 shows that with the switch in the position shown, power will enter the field coils at their lower end, viewing the field coil in the circuit diagram, while if contact element 44 is manipulated so that tab 278 moves into engagement with contacts 284 and tab 280 moves into engagement with contact 288, power enters the field coils 270 from their upper end as viewed in the circuit diagram. This, as stated above, reverses the rotational direction of the motor shaft in a manner well known in the art. The reason that the reversing switch is necessary is that some distributors currently in use are designed to rotate in one direction while others rotate in the opposite direction and the test instrument must be able to test all distributors regardless of the direction the distributor shafts normally rotate.

As stated above, the above described movement of the multiple switch 214 to its first position energizes the primary 250 of the power supply transformer 252. This causes the secondaries 290 and 292 in the power supply of the red neon lamp 146 to be energized and as will be seen the red neon lamp 146 will glow during the testing operation.

The secondaries 294 and 296 in the power supply for the blue neon lamp 148 are also energized but power is not supplied to the blue neon lamp because of the open contacts in switch 214, so that in the above described first position of the control switch 214, the blue neon lamp does not glow during the testing operation.

When the control element 42 is moved to its second position so shaft 218 rotates farther in the counterclockwise direction, tab 217 moving with contact 216 leaves contact 222 and engages open contact 224. At the same time tab 213 moving with contact 212 leaves contact 236 and moves to a connected contact 238.

While this is happening, tab 221 on contact 220 leaves open contact 228 and moves into engagement with contact 230. An inspection of this part of the switch shows that this movement closes the open contact in the power supply for the blue neon lamp 148 causing it to glow during the testing operation. Everything else remains the same, i.e. the red neon lamp can glow during the testing operation, the tachometer is still energized, the motor 78 continues to operate, and the lamp 67 for the roll chart 66 remains illuminated.

When the contact element 42 is moved to its third position tab 217 leaves contact 224 and moves to contact 226 while tab 213 leaves contact 238 and moves to connected contact 240. At the same time tab 221 leaves contact 230 and moves to contact 232. The only added effect in this operation is to energize the vacuum pump motor indicated generally by the reference numeral 298. The operation of the vacuum pump motor creates a suction in the vacuum line 56, see FIG. 1, which, when connected to the vacuum input of the distributor, tests the distributor vacuum control action in a manner well known in the art. In this respect control element 46, shown in FIG. 1, is connected to and operates a valve 47, see FIG. 3, for checking leakage in the distributor diaphragm. The speed of the vacuum pump motor 298, is constant, and the magnitude of the vacuum is adjusted by manual control element 48 by the method of metering inbled air.

The tachometer used in this testing instrument has a number of important advantages over those used in prior machines because it is more sensitive and easier to read.

In operation, current flows through wire 246 to portion 258 of the tachometer circuit, first passing through a current limiting resistor 299 and a half wave rectifier 300. The output of this half wave rectifier is fed to the RC smoothing filter 302, and the output of this filter is connected across the terminals of a gas tube 304 which maintains a constant voltage across its terminals over a wide variation of input current. In this embodiment, an OB3 gas tube was used, but others having similar characteristics may also be employed.

The positive terminal of tube 304 leads through a current limiting resistor 306 to the contact 100 of the dual breaker point structure 95 described above. The contact 104 associated with contact 100 is connected to contact 102 and to charging condenser 308.

When points 100 and 104 close, the current flowing from the positive side of the tube 304 charges condenser 308. As stated above, when contacts 100 and 104 are closed contacts 98 and 102 are always open and it will be recalled that when shaft 84 makes a half revolution, see FIG. 7, the points 100 and 104 will open and points 98 and 102 will close.

When this happens, condenser 308 charged by the closing of points 100 and 104 now discharges through closed points 98 and 102. This discharge passes through the RC smoothing filter comprising resistor 310 and condenser 312 along with the variable calibrating resistor 314. The output from these circuit elements is connected across the tachometer meter 34 and gives the pointer of the meter a deflection each time points 98 and 102 close.

The magnitude of this deflection is proportional to the energy delivered in any increment of time by condenser 308, which is proportional to the frequency that points 100 and 104 open and close. Within the speed range of this machine the period of time that points 100 and 104 remain closed is always sufficient to accumulate the same amount of charge on condenser 308 so that each discharge of condenser 308 through points 98 and 102 represent an equal amount of energy. Because of this fact the magnitude of the tachometer meter (34) deflection is directly proportional to the speed of rotation of shaft 84 and cam disk 96. See FIGS. 7 and 13.

As stated above, operation of motor 78 causes shaft 84 and cam 96 to rotate at a predetermined speed. This causes points 100 and 104 and points 98 and 102 to open and close once for each revolution of shaft 84. When shaft 84 rotates at comparatively high speeds such as are encountered by the distributor shaft during use, condenser 308 charges and discharges so rapidly that the pointer of the meter 34 does not have sufficient time to return to its rest position in the intervals between the times the condenser 308 is discharging. Consequently the indicator pointer of meter 34 will hover at a position which is proportional to the speed of rotation of shaft 84.

Distributors must be tested over a wide speed range and this tends to crowd the indicia on the tachometer meter and reduce both its sensitivity and its accuracy. To make the tachometer more sensitive and easier to read without resorting to larger and more expensive meters, a conventional double pole double throw centrifugal switch 114 was attached to shaft 106. This shaft as stated above, rotates at the same speed as shaft 84 and the shaft of the distributor being tested, see FIG. 7. After the speed of rotation of shaft 84 and 106 increases beyond a predetermined value, the centrifugal switch is actuated, see FIG. 13.

When the centrifugal switch is actuated and contacts 120 and 123 engage each other, a variable resistance 316 is connected to the circuit 258 of the tachometer meter 34. This resistance decreases the current through the tachometer meter so that shaft 84 must rotate at a substantially higher speed in order to produce a deflection on the meter which is the same as the deflection on the meter when the resistance 316 is not connected thereto.

In effect then, the connection of a resistance 316 to the tachometer meter expands its range. Consequently each deflection of the tachometer pointer corresponds to two possible rotational speeds, depending upon the operation of the centrifugal switch 114. For this reason the dial of meter 34 must have two scales each covering a different speed range, see FIG. 1. This requires an additional indicator for telling the operator of the testing instrument 10 which scale he should read. It is also to be understood and it is contemplated that the tachometer could have additional numbers of centrifugal switches or other speed sensing control devices and a corresponding number of scales for the tachometer.

In this embodiment, two indicating lights 35 and 37 are mounted on panel 14 below tachometer meter 34, see FIG. 1. As will be described below, each indicator light is associated with a particular scale on the tachometer dial, and when one of these lights is illuminated, it indicates that its associated scale on the dial of meter 34 should be read.

The indicator lights are powered by the secondary coil 318 of the power transformer 252. The leads 320 and 322 of this secondary coil are directly connected to the indicator lights 35 and 37 and one of the contacts 120 of the centrifugal switch 114 as shown in the circuit diagram.

With the contacts of the centrifugal switch 117 and 118 in engagement with each other, as shown in FIG. 13, current from the secondary coil 318 flowing through line 320 will flow through lamp 35 and back to coil 318 through wire 322 to complete a circuit. This will cause lamp 35 to light up on panel 14. When the speed of rotation of shaft 84 increases beyond a certain point, the action of the centrifugal switch 114 will cause contact 117 to move into engagement with contact 119, see FIG. 13. This will complete a circuit through lamp 37 causing it to light up while lamp 35 turns off.

As stated above, lamp 35 is associated with one scale on the tachometer, and when lamp 35 is on, it means that its associated scale should be read. Similarly when lamp 37 is on it means that its scale should be read on the tachometer dial. To prevent errors in reading, the scales on the tachometer dial are differently colored. The one associated with lamp 35 happens to be colored red in this embodiment, while the scale associated with lamp 37 is green. To correspond with the colors on the scale, lamp 35 is red and lamp 37 is green, so that it is only necessary to note the color of the lamp which is lit, and then to read the tachometer using the correspondingly color scale.

In summary then, the operation of the centrifugal control switch 114 in causing contact 117 to engage contact 119 and contact 120 to engage contact 123, simultaneously connects variable resistance 316 in circuit 258 to the tachometer meter 34 and turns off red lamp 35 and turns on green lamp 37. On the other hand, when the rotational speed of shaft 84 drops below the predetermined value, variable resistance 316 is disconnected from meter 34 and the green lamp 37 is turned off and the red lamp 35 is turned back on. With this arrangement, the tachometer is more sensitive and the indicia on the scale is easier to read because the full deflection speed range on each scale is smaller.

The power unit for lighting the neon lamps 146 and 148 is indicated generally by the reference numeral 324 and consists of two identical power supplies, one for each neon lamp. The power supply for the red neon lamp 146 includes the high voltage and low voltage secondary coils 290 and 292. One terminal of high voltage coil 290 is connected to a half wave rectifier 326. The positive output of the half wave rectifier is connected through a filter network 328 and a current limiting resistor 330 to the plate or anode 332 of a pentagrid converter 334, which in this particular embodiment is a 6BE6 electron tube. As seen, all five of the grids 336 of this tube are connected together. It is to be understood, however, as will become apparent from a further understanding of the operation of the power supply that the selection of the pentagrid converter tube, and the use of a 6BE6 electron tube in particular, is based on their availablity and for economic reasons, and the principles of this invention can be practiced using other suitable tubes. The same thing is true in regard to the neon lamps employed in this embodiment, and other kinds of glow tubes can be used. The cathode 338 of tube 334 is grounded to the chassis of the instrument for reasons to become apparent below.

The opposite end of secondary coil 290 is connected to the opposite side of the filter network 328 to form the negative side of the high voltage supply. This negative side is connected through a variable resistor 340 and brush 136 to one terminal of the neon tube 146. The variable resistor 340 is important because it permits an adjustment of the voltage applied to the neon tube 146 in order to prevent phenomena like the Faraday or Crook dark spaces from obscuring the glow of the neon lamp through the slots in disk 140.

The power supply for the red neon lamp 146 further includes a control circuit comprising the low voltage secondary coil 292. One end of this coil is connected to a half wave rectifier 342. The positive output of this rectifier is smoothed and filtered by the RC network 344 and is connected to the grids 336 of the tube 334 for reasons to become apparent below. The opposite end of coil 292 is connected to the opposite side of the filter network 344 to form the negative side of the low voltage power supply. This negative side is connected to lead 52 for connection to the ungrounded distributor point 203.

Similarly, the power supply for the blue neon lamp 148 which is identical with the power supply for the red neon lamp includes secondary coil 294, a half wave rectifier 346, a filter network 348, a current limiting resistor 350, a 6BE6 pentagrid converter 352 with an anode 354, connected grids 356, a cathode 358, and a variable resistor 360, all connected as shown in the circuit diagram.

In understanding the operation of the power supply, it is first noted that the leads 52 and 54 or both must be connected to be ungrounded distributor point 203 in the distributor being tested in order that its associated power supply can operate. The opposing distributor point 205 is grounded to the chassis of the instrument, through the body of the distributor which as seen in the circuit diagram is at the same potential as the cathodes 338 and 358 of the tubes 334 and 352. With this arrangement, when points 203 and 205 close, leads 52 and 54 from the negative sides of the control circuits are connected to the cathodes of the above described tubes. This completes a circuit in the power supply causing the neon lamp of each power supply connected to the distributor point 203 to glow.

Referring to the power supply connected to the red neon lamp 146 by way of example, since the power supply connected to the blue neon lamp 148 is identical in every respect, tube 334 is non-conductive when points 203 and 205 of the distributor being tested are open. The output of the secondary coil 290 including the half wave rectifier 326 and the filter networks 328, etc., is about 1000 volts when the tube 334 is in this non-conductive condition. While the neon lamp is not operating, a large part of this voltage is effectively between the cathode 338 and anode 332.

When the points 203 and 205 in the distributor being tested close, coil 292 with the half wave rectifier 342 and the filter network 344 raises the potential of the five connected grids in tube 334 by about 30 volts with respect to the cathode 338. This positive grid bias on all the connected grids causes a massive electron flow from the cathode 338 to the grids 336 with some electrons reaching the anode 332 and starting the tube conducting. This large electron flow from the cathode to the anode causes a rapid increase in the potential of the grounded cathode, and since one terminal of neon lamp 146 is connected to this grounded cathode when points 203 and 205 are closed, the potential of this grounded terminal of neon lamp 146 will also increase with respect to the negative side of the power supply. Thus the circuit may be described as having a floating ground. When the potential rise of the cathode and hence the grounded terminal of the neon lamp exceeds the ignition voltage of the lamp, the lamp 146 starts to glow.

As soon as tube 334 becomes conductive and neon lamp 146 starts to glow, the voltage output of the power supply for the neon lamp 146 drops to about 460 volts. This voltage drop is desirable and to achieve same requires only a careful selection of the components employed in the power supply, in a manner well known in the art.

In summary, while the tube 334 is non-conductive and the neon lamp 146 is off, the power supply maintains the output voltage at about 1000 volts, but when these tube elements begin to operate, the increased energy requirement in the circuit is reflected by the above described voltage drop. This voltage drop is important because if the power supply voltage did not drop when tube 334 became conductive and neon lamp 146 began to glow, the voltage across the conductive tube would be at about 800 volts, and this could cause arcing in the grids of the tube 334, which could destroy tube control. Furthermore, the high voltage in the circuit could cause random arc flashes in the neon lamp which might cause errors in reading the instrument. Lowering the voltage brings the neon discharge into the desired region of stable light output.

When points 203 and 205 open, the grids 336 of tube 334 are no longer maintained at their positive potential with respect to the cathode, and the massive number of electrons in transit in the tube becomes a space charge in the tube which helps to stop further electron flow from the cathode 338. In addition, the neon tube 146 has the added function of briefly causing the cathode to be at a potential higher than the grid. The reason is that the electrodes in the neon tube are large enough so that the charge in the electric field between the electrodes discharges into the cathode causing the momentary voltage rise. Both the massive space charge and the effect of the cathode being momentarily higher in potential than the grids causes the tube 334 to abruptly become non-conductive, and this results in a rapid voltage drop in the cathode and hence a rapid voltage drop between the terminals of the neon lamp 146 so that the lamp 146 abruptly becomes extinguished. These effects happen very rapidly and in the operating range in which the distributors are tested, there is no important time lag between the closing and opening of the distributor points and the turning on and turning off of the neon lamps.

It is important to note that the condenser of the distributor does not have to be disconnected during the test. The reason is that the distributor points 203 and 205 are a part of the grid circuit of the pentagrid converters and are not in a circuit which directly powers the neon lamp. Consequently the D.C. voltages across points 203 and 205 are small so that the effect of the condenser 207 in charging and discharging into the grid circuit each time the points open and close is insignificant. Furthermore the voltage between the cathode and grids of the pentagrid converter is D.C. so the condenser cannot act as a short circuit. Besides this, the lower D.C. voltages and currents across the points are not harmful and the operation of the tubes 334 and 352 do not generate high frequency radio waves which could interfere with local radio reception. Additionally, the operation of one power supply does not affect the operation of the other.

Although the above described power supply has been used in the present distributor testing instrument, it is evident that this circuit has independent utility and could be used wherever it is desired to synchronize a rapid mechanical repeating movement with an electrical pulse.

In summary, to operate the testing instrument, the distributor to be tested is first mounted on the instrument by means of the mounting structure 72, with the end of the distributor shaft connected to chuck or clutch 76 in a manner well known in the art. Next the finger operated wheel 64 is rotated until the data pertinent to the model of the distributor to be tested appears in window 68. Next from the data in this chart, control element 44 is adjusted so that the distributor shaft will rotate in the proper direction. The vacuum line 56 may then be connected to the vacuum input of the distributor if the distributor has a vacuum advance control. Then if dwell, for example, is to be measured, only one lead, lead 52 for example, need be connected to the ungrounded distributor point.

The control switch 214 is then rotated to its first position as described above. Then control element 40 is adjusted until the distributor shaft is rotating at a constant predetermined speed, 1000 r.p.m. for example.

As stated above, a light pattern consisting of apparently stationary bands of light will appear on calibrated disk 24 so that the dwell can be measured directly in degrees. The spacing between the points or contacts is then adjusted by the usual means until the angular arc of these bands of lights equals the value fixed by the manufacturer as it appears on the roll chart 66.

Figure 14:
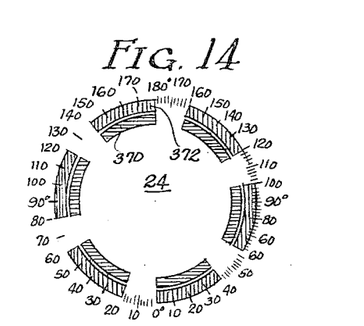
FIG. 14 is a view of the calibrated disk of the instrument with a light pattern thereon for a perfect distributor in a six cylinder engine.

In checking for wear, both leads 52 and 54 are connected to the ungrounded distributor contact 203 and control element 42 is advanced to its second or third position depending on model of the distributor being tested. If this is done, a blue band of light 370 will appear in adjacent abutting radially spaced relation to each red band of light 372 because of the radial spacing of slots 142 and 144. If the distributor is in perfect condition the light pattern will appear as shown in FIG. 14.

Figure 15:
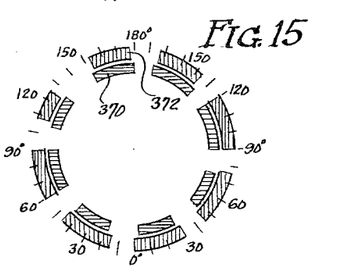
FIG. 15 is a view of the light pattern on the calibrated disk when the distributor has a bent shaft.
Figure 16:
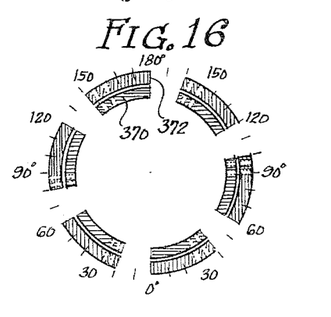
FIG. 16 is a view of the light pattern on the calibrated disk when the distributor has point bounce.

Any difference in the arc lengths between adjacent red and blue bands of light will indicate defects due to cam wear, bearing wear, or a bent shaft, and the magnitude of the defect can be precisely measured by means of the calibrated disk 24 in a manner well known in the art, see FIG. 15. Defects in the distributor causing point bounce will appear as shown in FIG. 16.

Figure 17:
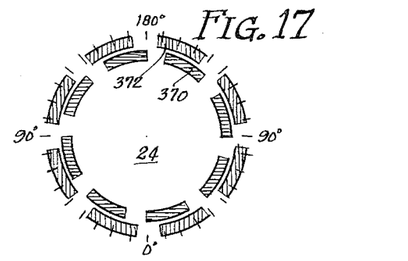
FIG. 17 is a view of the light pattern on the calibrated disk for a perfect dual point distributor.

When analyzing a dual point distributor, leads 52 and 54 are each connected to separate ungrounded distributor points, such as point 203. Any jumper connector within the distributor connecting the two ungrounded points is temporarily disconnected so that one such point controls the red neon lamp, 146, and the other such point controls the blue neon lamp, 148. In effect, this is merely separating the control of the power supplies of the lamps 146 and 148, and indicating the function of each on the disk 24 as shown in FIG. 17.

The operating details of the electrical circuits as described above, pertaining to analyzing a single-point distributor, are the same when analyzing the dual-point distributor. Associated single-point distributors may be analyzed in a like manner by merely connecting lead 52 to the ungrounded point of one, and lead 54 to the ungrounded point of the other. In addition this invention may be adapted to analyze the operation of three or more associated distributors by merely adding an additional power supply circuit and indicating lamp for each distributor.

In this respect, since both leads 52 and 54 are connected to the ungrounded distributor point 203 when checking for wear, neon lamps 146 and 148 will turn on and off simultaneously. This suggests that the testing instrument could be modified so that instead of using two neon tubes and two separate power supplies, only one neon tube with an appropriate optical system could be used to give the impression of two differently colored sources of light on each side of the shaft 106. The advantage of such a modification would be that only one power supply would be necessary.

The invention may be embodied in other forms without departing from the spirit or essential characteristics thereof as set forth in the claims and the present embodiment is therefore to be considered as illustrative and not restrictive, and it is intended to include all changes which come within the scope and range of the claims.

We claim:

1. An instrument for testing distributors for internal combustion engines comprising a scale, an indicator including a glow tube mounted for rotation in effective relation with said scale, means for rotating said indicator and the shaft of a distributor under test, a high voltage direct current source for illuminating said glow tube, a control circuit including a low voltage direct current source and an electron tube having an anode, cathode and grid means, the positive side of said low voltage direct current source connected to said grid means, one cooperating breaker point in the distributor adapted to be connected to the negative side of said low voltage direct current source and the other cooperating breaker point adapted to be connected to said cathode whereby said cooperating breaker points are in the circuit of said low voltage direct current source so that the distributor can be tested without removing the normal distributor condenser and without high voltage arcing damage to the breaker points, said anode connected to the positive side of said high voltage direct current source, the terminals of said glow tube respectively connected to the negative side of said high voltage direct current source and said cathode, whereby the closing of said breaker points applies a positive bias on said grid means, said grid means having the control characteristics of connected-together grids in a pentagrid converter so when said grid means has a positive bias it causes massive electron flow and abrupt conduction through said electron tube, thereby effectively connecting said high voltage direct current source across the terminals of said glow tube to cause abrupt intense illumination of said glow tube, the opening of said breaker points removing the positive bias from said grid means whereby the electrons in said massive electron flow form a massive space charge which causes said electron tube to become abruptly non-conducting thereby completely removing high voltage from the terminals of said glow tube and thereby abruptly extinguishing said glow tube, whereby the rotating glow tube turns on and off in synchronism with the movement of said breaker points and forms light patterns on said scale.

2. The instrument described in claim 1 wherein the cathode-connected terminal of said glow tube is connected to said cathode in such a way that when said breaker points open and the positive bias on said grid means is removed the charge in the electric field in said glow tube discharges into said cathode causing the potential of said cathode to momentarily rise higher than the potential on said grid means, the higher potential on said cathode cooperating with the massive space charge to cause said electron tube to become abruptly non-conductive, thereby completely removing said high voltage direct current source from the terminals of said glow tube to abruptly extinguish said glow tube.

3. The apparatus set forth in claim 1 wherein said electron tube is a pentagrid converter with all the grids connected to a common terminal.

4. The apparatus set forth in claim 3 wherein said low voltage direct current source has a voltage output in the neighborhood of 30 volts and said high voltage source has a voltage output in the neighborhood of 1000 volts when the pentagrid converter is non-conductive and the glow tube is off, and wherein the voltage output of the high voltage source drops to around 460 volts when the pentagrid converter becomes conductive and the glow tube turns on whereby arcing among the grids of the pentagrid converter in its conductive state is prevented and the glow tube is maintained in operation in a stable condition.

5. A circuit for synchronizing the flashing of a glow tube with the movement of a pair of electrical contacts in high frequency engagement and disengagement with each other comprising in combination a glow tube, a pair of electrical contacts a high voltage direct current source, an electron tube, said electron tube including an anode, grid means, and a cathode, the positive side of said high voltage source connected to said anode, the negative side of said high voltage source connected to one terminal of the glow tube, the other terminal of said glow tube connected to said cathode, and a control circuit, said control circuit comprising a low voltage direct current source, the positive side of said low voltage source connected to said grid means, the negative side of said low voltage source connected to one of said electrical contacts, the cathode connected to the other of said electrical contacts whereby said electrical contacts are in the circuit of said low voltage direct current source, the magnitudes of said high voltage source and the low voltage source and the design of said grid means such that when the electrical contacts close, the electron tube abruptly becomes conductive thereby effectively connecting said high voltage source across the terminals of said glow tube to cause abrupt intense illumination of said glow tube, and when the electrical contacts open the electron tube abruptly becomes non-conductive thereby completely removing the high voltage from the terminals of the glow tube whereby the glow tube turns completely on and off each time the electrical contacts close and open without any appreciable time lag between the response of the glow tube and the movement of the electrical contacts.

6. A circuit for synchronizing the flashing of a glow tube with the movement of a pair of electrical contacts in high frequency engagement and disengagement with each other comprising in combination a glow tube, a pair of electrical contacts a high voltage direct current source, a pentagrid converter electron tube having an anode, grids and a cathode, the positive side of said high voltage source connected to said anode, the grids of said pentagrid converter all connected to a common contact, the negative side of said high voltage source connected to one terminal of the glow tube, the other terminal of said glow tube connected to said cathode, and a control circuit, said control circuit comprising a low voltage direct current source, the positive side of said low voltage source connected to said grids, the negative side of said low voltage source connected to one of said electrical contacts, the cathode connected to the other of said electrical contacts whereby said electrical contacts are in the circuit of said low voltage direct current source, the magnitudes of said high voltage source and the low voltage source such that when the electrical contacts close, the pentagrid converter abruptly becomes conductive thereby effectively connecting said high voltage source across the terminals of said glow tube to cause abrupt intense illumination of said glow tube, and when the electrical contacts open the electron tube abruptly becomes non-conductive thereby completely removing the high voltage from the terminals of the glow tube whereby the glow tube turns completely on and off each time the electrical contacts close and open without any objectionable time lag between the operation of the glow tube and the movement of the contacts.

7. The apparatus set forth in claim 6 wherein said low voltage source has a voltage output in the neighborhood of 30 volts, and the high voltage source has a voltage output in the neighborhood of 1000 volts when the pentagrid converter is non-conductive and the glow tube is off, and drops to a voltage output in the neighborhood of 460 volts when the pentagrid converter becomes conductive and the glow tube goes on, whereby arcing among the grids of the pentagrid converter in its conductive state is prevented while the glow tube is maintained in operation.

8. A circuit for synchronizing the flashing of a glow tube with the movement of a pair of electrical contacts in high frequency engagement and disengagement with each other comprising in combination a glow tube, a pair of electrical contacts a high voltage direct current source, an electron tube, said electron tube including an anode, grid means and a cathode, the positive side of said high voltage source connected to said anode, the negative side of said high voltage source connected to one terminal of the glow tube, the other terminal of said glow tube connected to said cathode, and a control circuit, said control circuit comprising a low voltage direct current source, the positive side of said low voltage source connected to said grid means, the negative side of said low voltage source connected to one of said electrical contacts, the cathode connected to the other of said electrical contacts to provide a positive bias on said grid means when the electrical contacts engage each other, the magnitude of said high voltage source such that when the electrical contacts are open and no bias is on the grid means the electron tube is non-conductive, the magnitude of said low voltage source and the design of said grid means such that when the electrical contacts close the positive bias on the grid means starts a massive electron flow from the cathode causing the electron tube to become conductive, thereby effectively connecting said high voltage source across the terminals of said glow tube to cause abrupt intense illumination of said glow tube, the opening of said electrical contacts removing the positive bias from said grid means whereby the electrons in said massive electron flow form a massive space charge, the cathode connected terminal of said glow tube connected to said cathode in such a way that when said electrical contacts open and the positive bias on said grid means is removed the charge in the electric field in said glow tube discharges into said cathode causing the potential of said cathode to momentarily rise higher than the potential on said grid means, the higher potential on said cathode cooperating with the massive space charge to cause said electron tube to become abruptly non-conductive, thereby completely removing said high voltage direct current source from the terminals of said glow tube to abruptly extinguish said glow tube, wherefore there is no appreciable time lag between the response of the glow tube and the movement of the electrical contacts.

References Cited by the Examiner

UNITED STATES PATENTS

| | | | |
|---|---|---|---|
| 1,266,487 | 5/1918 | Kolff | 324—70 |
| 1,705,446 | 3/1929 | Guillet | 315—219 |
| 2,050,530 | 8/1936 | Haskins | 340—268 |
| 2,052,688 | 9/1936 | Allen | 340—268 |
| 2,097,400 | 10/1937 | Bachelor | 315—183 |
| 2,136,924 | 11/1938 | Reitherman | 315—209 X |
| 2,221,923 | 11/1940 | Passauer | 81—19 |
| 2,442,286 | 5/1948 | Dodds et al. | 315—180 X |
| 2,616,320 | 11/1952 | Vosper | 81—19 |
| 2,658,167 | 11/1953 | Harris | 315—183 X |
| 2,684,440 | 7/1954 | Wallace et al. | 315—340 X |
| 2,703,376 | 3/1955 | Board | 315—219 |
| 2,774,939 | 12/1956 | Hastings | 324—70 |

FOREIGN PATENTS 906,363 3/1954 Germany.

GEORGE N. WESTBY, *Primary Examiner.*

ELI J. SAX, RALPH G. NILSON, BENNETT G. MILLER, *Examiners.*